Nov. 27, 1928.
W. P. PEMBROKE
1,693,494
MACHINE FOR TESTING TYPEWRITING RIBBONS, CARBON PAPER, ETC
Filed July 6, 1926    4 Sheets-Sheet 3
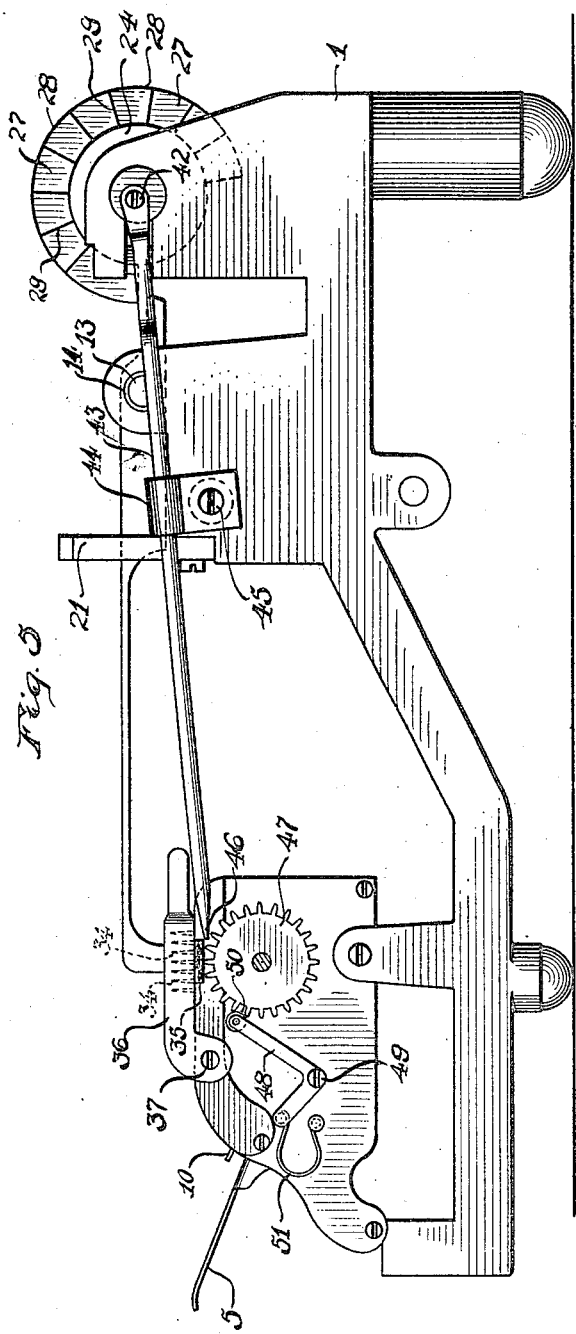
INVENTOR
Winfield P. Pembroke
BY
Davis & Simms
his ATTORNEYS

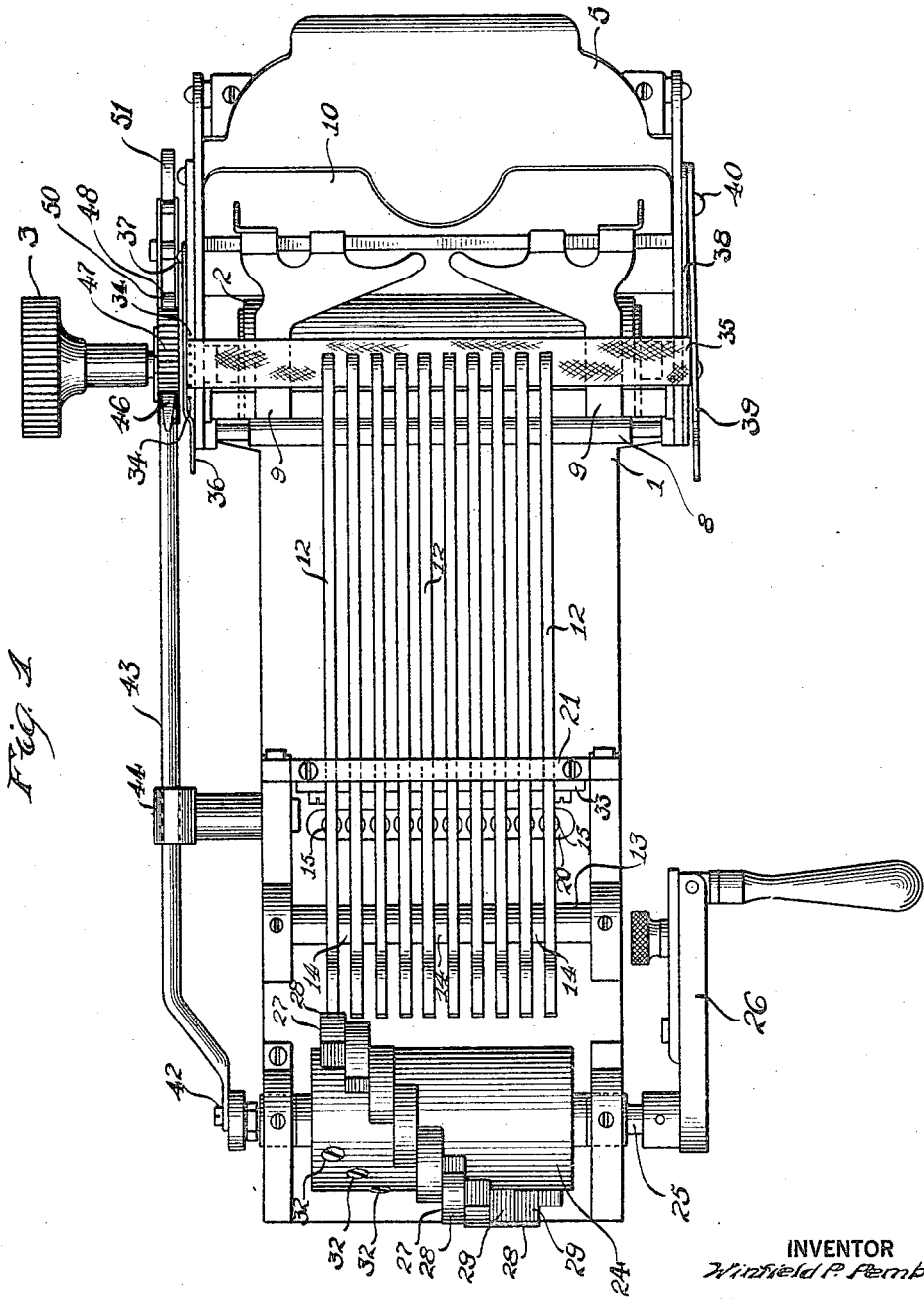

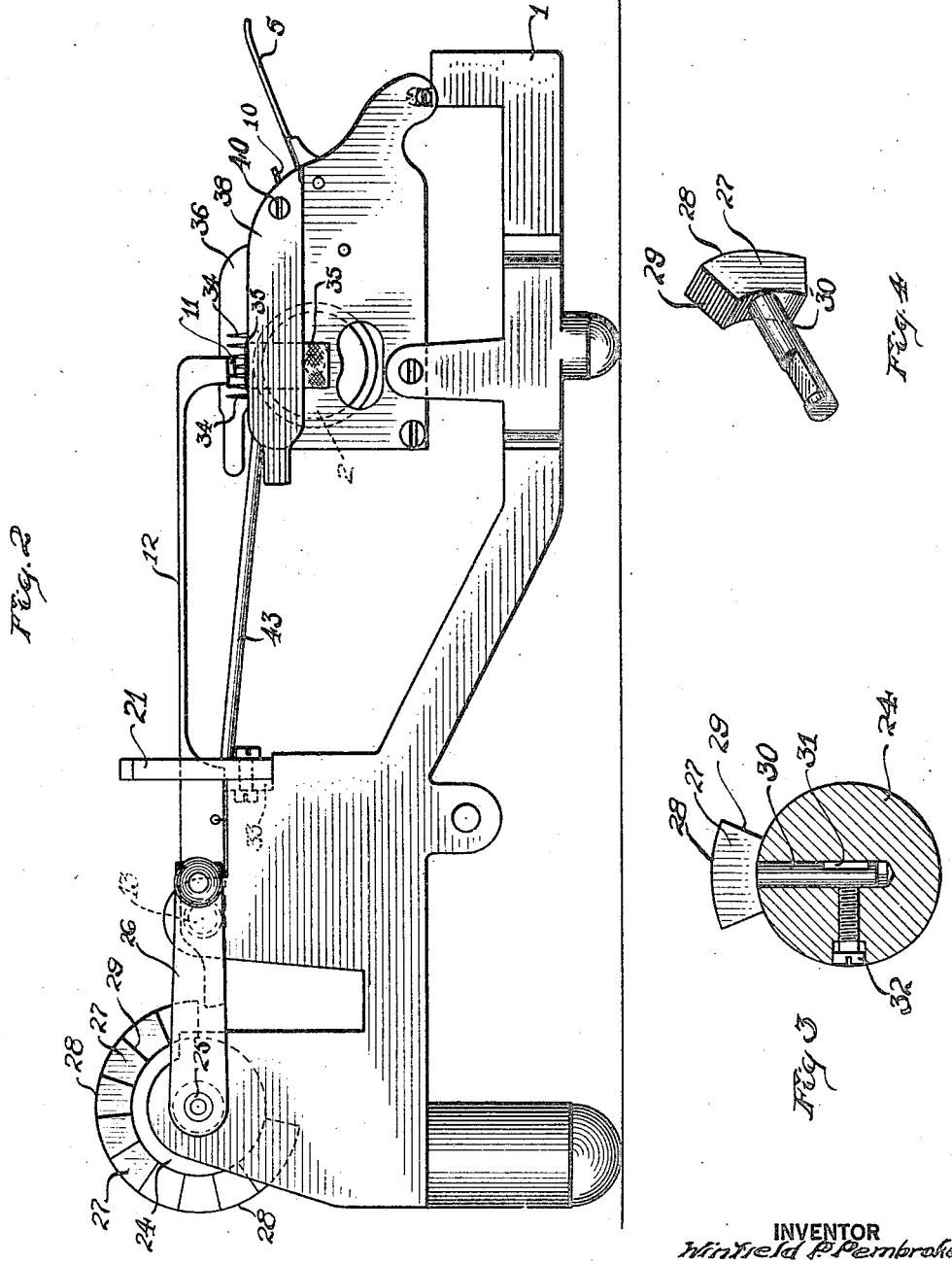

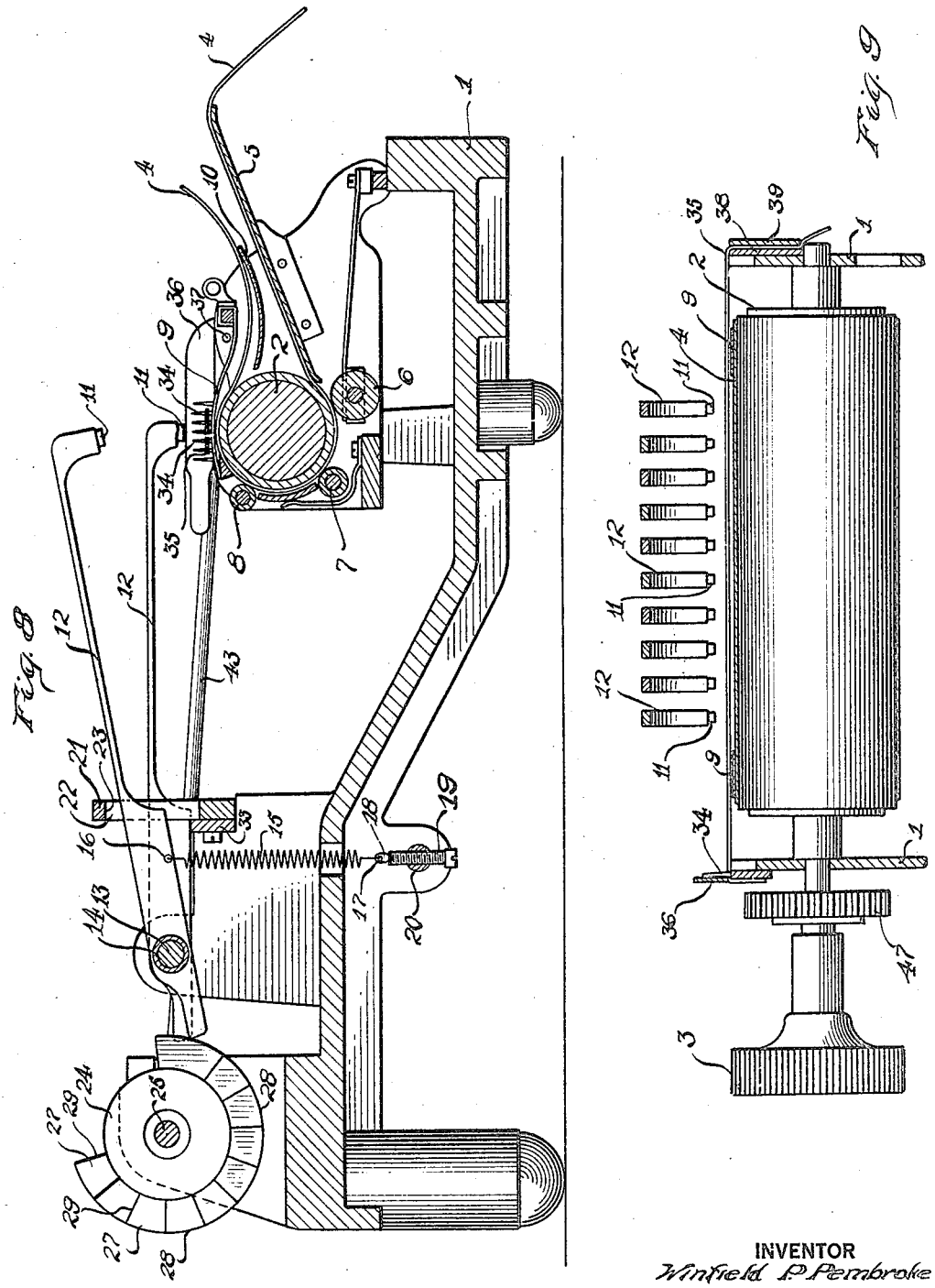

Patented Nov. 27, 1928.

1,693,494

UNITED STATES PATENT OFFICE.

WINFIELD P. PEMBROKE, OF ROCHESTER, NEW YORK, ASSIGNOR TO KEE LOX MANUFACTURING COMPANY, OF ROCHESTER, NEW YORK.

MACHINE FOR TESTING TYPEWRITING RIBBONS, CARBON PAPER, ETC.

Application filed July 6, 1926. Serial No. 120,699.

The present invention relates to wear down testing machines for typewriting ribbons, carbon paper and other and similar material, and an object of the invention is to provide a construction which will subject the material being tested for its wear down properties to a number of successive impacts of equal force at one and the same point until the material wears down. Another object of the invention is to provide a holding means for the ribbon, carbon and other material which will permit the material to be held without undue tension thereon which tends to reduce the wear down properties of the material. Still another object of the invention is to associate with the wear down mechanism a feeding mechanism which will automatically feed a record sheet relatively to the wear down mechanism and the holding means for the material being tested so as to determine the number of impressions made by the mechanism in the test.

To these and other ends, the invention consists of certain parts and combinations of parts, all of which will be hereinafter described: the novel features being pointed out in the appended claims.

In the drawings:—

Fig. 1 is a plan view of a wear down testing machine constructed in accordance with this invention;

Fig. 2 is a view of one side of the machine;

Fig. 3 is a sectional view through the operating member for the impact devices;

Fig. 4 is a perspective view of one of the adjustable operating devices on the operating member;

Fig. 5 is a view of the opposite side of the machine from that shown in Fig. 2;

Fig. 6 is a fragmentary vertical section adjacent the stop for the lever;

Fig. 7 is a transverse vertical section in the plane of the springs for the levers;

Fig. 8 is a central longitudinal vertical section through the machine;

Fig. 9 is an enlarged fragmentary vertical section in the plane of the platen;

Fig. 10 is an enlarged section of the spring adjusting means.

In the embodiment of the invention, 1 indicates the frame of the machine. This frame supports a wear down mechanism which comprises, in this instance, a platen 2 preferably in the form of a roller having a knurled wheel 3 on the shaft thereof through which the platen may be turned. This platen is adapted to support a record sheet 4, the latter being fed to the platen over a feeding table 5 around the underside of the platen between the latter and a resiliently mounted roller 6, thence upwardly in front of the platen between the latter and two pressure rollers 7 and 8, and finally above the platen and under spring retaining fingers 9. The turning of the platen clockwise, as illustrated in Fig. 8, feeds the record sheet under the platen, thence upwardly over the platen and rearwardly over the discharge plate 10. Also forming part of the wear down mechanism are the impact devices 11 in the form of type, there being provided, in this instance, ten of such type, but it is apparent that the number thereof is immaterial. These type are supported on levers 12 which are independently pivoted on a shaft 13 which is held against turning in the frame 1 and which also has surrounding it spacing rings 14 holding the levers 12 in spaced relation to each other and to the frame. These levers, in this instance, are all of equal length and each supports the type in a line parallel with the axis of turning of the platen. Each lever is urged toward the platen by its individual spring 15, one end of which is secured at 16 to a lever, while the opposite end is secured at 17 to a rod 18 which is mounted within a screw 19 adjustable in a rod 20 supported on the frame 1, the rod 18 being connected to the screw 19 in such a manner that while it moves axially with the screw, it does not turn with the screw so that the adjustment of the screw 19 does not cause any turning action on the spring 15. It will thus be seen that the tensions on the springs 15 may be adjusted to correspond as nearly as possible to each other.

With the end of preventing undue vibration of the type carrying levers 12 a guide frame 21 is provided, provided with slots 22 in which the levers 12 operate, the walls of said slots guiding the levers in their upward and downward movements. The upper ends 23 of these slots act as abutments to limit the upward movements of the levers, these abutments making it impossible to carry each lever above a certain position so that the upward movement of the lever is defined.

The operating means for the type carrying levers embodies, in this instance, a drum 24 which is rotatably mounted on the frame of the machine and has on its shaft 25 a crank handle 26 through which the drum may be turned. This drum carries a plurality of operating devices, one for each impact lever. These operating devices are in the form of segments 27 having curved faces 28 concentric with the axis of turning of the drum and abutment faces 29 substantially radial to such axis of turning. The segmental members are supported on stems 30 which fit into radial bores 31 in the drum 24 and are held therein adjustably by set screws 32. Each segmental member is radially shifted with reference to the one next to it so as to form about the drum a substantial helix and to operate on the levers successively from one side of the series of levers to the other. These segmental members do not extend completely about the drum so that the drum rotates for a certain period without engaging any of the levers. When the drum is rotated clockwise as shown in Fig. 1, the abutment surface 29 of each segment or operating device first engages a lever and the drum and lever move together about their axes causing the lever to elevate the type or impact devices against the action of one of the springs 15. Thereafter the lever rides off the abutment surface 29 and onto the curved surface 28 thereby permitting the drum to have a lost motion connection with the lever while holding the lever in its elevated position. It is apparent that if the abutment surface 29 should strike the lever with force and then the lever should be immediately released, it would be impossible at all times to raise the lever to the same position as the elevation of the lever would depend upon the force of impact between the operating devices and the lever. In this construction, owing to the fact that after the abutment 29 has hit the lever, the latter engages the surface 28 and the lever is held by said surface for a time in a stationary elevated position, such elevated position is clearly defined and, at the same time, all vibration in the lever is stopped before the latter descends under the action of its spring, so that, on the descent, the spring takes hold of the lever without any outside interference due to vibrations or different elevations and the lever descends each time with the same force against material being tested. It is apparent that by adjusting the segment through the stem 30 and the adjusting screw 31, the throw of the lever will be varied. The adjustment of each segment should be such that the lever when raised will be just slightly below the stop 23, the surface 28 permitting the lever to swing upwardly to the stop but stopping it after a very small downward movement and holding it in an elevated position until the lever descends, under the action of its spring. The lever in descending strikes against the abutment plate 33 which holds it out of contact with the platen, the levers being reduced between this abutment plate and the type or impact devices 31 so that the levers will yield in order to cooperate with the platen after their movements have been stopped by the stop or abutment plate 33.

The holding means for the material to be tested embodies, in this instance, a series of pins 34 supported at one side of the roller platen 2 on the frame of the machine and over which the material 35 to be tested is fitted, a lever 36 pivoted at 37 then being moved downwardly to one side of the pins or projections to hold the material on the pins and, at the same time, to protect the user against injury from the pins. The material is held at the opposite end of the roller by a means which prevents the material being held under undue tension. This means, in this instance, embodies a plate 38 over the upper straight edge of which the material is passed; and a holding lever 39 pivoted at 40 and swung downwardly to frictionally hold the material against the outer face of this plate 38 as illustrated in Fig. 9. The lower ends of the pins 34 and the upper edge of the plate 38 are substantially in the same plane so that the material 35 is held in a parallel plane with the axis of turning of the roller 39 but slightly spaced from the roller. At the same time, the stop plate 33 normally holds the type faces slightly above the material being tested as illustrated in Fig. 2. If undue tension is placed on the material 35 to be tested, then the first type hitting this material will relieve the tension by pulling one end of the material through the frictional clamping means 38 and 39 and thereafter the tension on the material will be substantially constant.

As before pointed out, the operating devices on the operating drum 24 are spaced so that the drum may move independently of any of the levers during a certain period of its rotation. During this period, automatic means may be brought into operation for feeding the record sheet. This automatic means, in this instance, embodies an eccentrically arranged wrist pin 42 on the shaft of the operating roller 24. On this wrist pin a pitman 43 turns, this pitman being guided in a sleeve 44 which is mounted to rock on a pivot pin 45 on the main frame 1 of the machine. The end of this pitman is pointed at 46 and serves as a ratchet tooth for engagement with a toothed ratchet wheel 47 arranged on the shaft of the platen roller 2. A centering device cooperates with this toothed ratchet to hold it in its adjusted position. This centering lever 48 is in the form of a bellcrank lever pivoted at 49 to the frame of the machine and having a roller at one end cooperating with the ratchet wheel and its other end engaged by a U shaped spring 51 which urges said roller 50 toward the ratchet wheel 47 while permitting the roller to yield when the ratchet wheel 47 is turned on the pawl 46 on the pitman 43.

It is apparent that the eccentric wrist pin 42 causes the pitman to rock and to slide. On the forward movement the pawl 46 is thrown into engagement with the ratchet wheel and moves the ratchet wheel in a direction to shift the platen which also shifts the record sheet. On the return movement of the pitman 43 the latter throws the pawl 46 upwardly out of engagement with the ratchet wheel and moves the pawl rearwardly for its return movement.

From the foregoing it will be seen that there has been provided a wear down testing machine for typewriting ribbons, carbons, etc., in which there is provided a holding means for the material to be tested so constructed that undue tension on the material cannot be maintained, thus preventing an improper testing of the material, as might be the case if the material were held under tension. There has also been provided a novel means for automatically effecting the shifting of the record sheet after the impact devices have completed their movement, so that a new portion of the record sheet is presented to the impact devices. There has also been provided a wear down mechanism which eliminates personal influence of the operator, making it possible for the operator to effect the operation of the impact devices with different forces on different occasions. The speed of operation of the operating member is immaterial as each impact device is brought to a stop at its upper position before descending into engagement with the material being tested, and is then released to the action of a spring over which the operator has no control through the operating member. All vibrations in the impact devices which would interfere with the proper test of the material have been eliminated.

What I claim as my invention and desire to secure by Letters Patent is:

1. A wear down testing machine for typewriting ribbons, carbons and the like comprising a platen, means for holding material to be tested in cooperation with the platen, an impact device for cooperating with the material and the platen, a lever carrying said impact device and having a resilient portion between the impact device and the pivot of the lever, said lever having a normal tendency to move toward the platen, a stop engaging said lever and limiting the movement of the lever toward the platen so that the resilient portion bends to permit the impact device to strike the platen, and means for moving said lever away from the platen, said means having provision for holding said lever against movement for a limited time to cause said lever to assume a definite position away from the platen on each operation thereof in order that successive strokes of the lever will be uniform.

2. A wear down testing machine for typewriting ribbons, carbons and the like comprising a platen, means for holding material to be tested in cooperation with the platen, an impact device for cooperating with the material and the platen, a lever carrying said impact device and having a resilient portion between the impact device and the pivot of the lever, said lever having a normal tendency to move toward the platen, a stop engaging said lever and limiting the movement of the lever toward the platen so that the resilient portion bends to permit the impact device to strike the platen, means for moving said lever away from the platen, said means having provision for holding said lever against movement for a limited time to cause said lever to assume a definite position away from the platen on each operation thereof in order that successive strokes of the lever will be uniform, said means comprising a rotary member and an operating device thereon having an abutment surface which effects the movement of the lever to carry the impact device away from the platen, and a curved surface which cooperates with the lever during the rotation of the member to hold the lever temporarily in stationary position.

3. A wear down testing machine of the class described comprising a platen, means for holding material to be tested in cooperation with the platen, a plurality of impact devices for cooperating with the material and the platen, levers carrying said impact devices and each having a resilient portion between its impact device and its pivot, said levers having a normal tendency to move toward the platen, a stop for engaging all of said levers between their pivots and their resilient portions, and means for moving said levers away from the platen embodying a rotary member, a plurality of operating devices thereon, one for each lever, each having an abutment surface which effects the movement of its lever to carry the impact device thereon away from the platen, and each having a curved surface substantially concentric with the axis of turning of the rotary member to hold its lever temporarily in stationary position, said operating devices being independently adjustable toward and from the center of rotation of the rotary member.

WINFIELD P. PEMBROKE.